US010325561B2

(12) United States Patent
Seibert et al.

(10) Patent No.: US 10,325,561 B2
(45) Date of Patent: Jun. 18, 2019

(54) TRANSITIONING BETWEEN MIXED, AUGMENTED, AND/OR VIRTUAL REALITY DISPLAY MODES

(71) Applicant: Dell Products, L.P., Round Rock, TX (US)

(72) Inventors: Philip M. Seibert, Austin, TX (US); Larry Edward Knepper, Leander, TX (US)

(73) Assignee: Dell Products, L.P., Round Rock, TX (US)

( * ) Notice: Subject to any disclaimer, the term of this patent is extended or adjusted under 35 U.S.C. 154(b) by 129 days.

(21) Appl. No.: 15/458,011

(22) Filed: Mar. 13, 2017

(65) Prior Publication Data
US 2018/0261166 A1 Sep. 13, 2018

(51) Int. Cl.
*G09G 3/00* (2006.01)
*G09G 3/34* (2006.01)
*G09G 3/3208* (2016.01)
*G02B 27/01* (2006.01)

(52) U.S. Cl.
CPC ....... *G09G 3/3433* (2013.01); *G02B 27/0172* (2013.01); *G09G 3/002* (2013.01); *G09G 3/3208* (2013.01); *G09G 2320/0626* (2013.01); *G09G 2320/08* (2013.01); *G09G 2360/144* (2013.01)

(58) Field of Classification Search
CPC .... G09G 3/3433; G09G 3/002; G09G 3/3208; G09G 2320/08; G09G 2360/144; G09G 2320/0626; G02B 27/0172
See application file for complete search history.

(56) References Cited

U.S. PATENT DOCUMENTS

| 2013/0187835 A1* | 7/2013 | Vaught | G06K 9/00604 345/8 |
| 2016/0025963 A1* | 1/2016 | Andou | G02B 26/02 359/230 |
| 2018/0199028 A1* | 7/2018 | Ratcliff | G02B 27/0172 |

OTHER PUBLICATIONS

Odom, Jason, "Samsung's New Remote Desktop Smartglasses Blur the Line Between Virtual & Augmented Reality", Feb. 22, 2017, 5 pages.

* cited by examiner

*Primary Examiner* — Robert J Michaud
(74) *Attorney, Agent, or Firm* — Fogarty LLP

(57) ABSTRACT

Systems and methods for transitioning between mixed, augmented, and/or virtual reality display modes. In some embodiments, an Information Handling System (IHS) may include a processor and a memory coupled to the processor, the memory including program instructions stored thereon that, upon execution by the processor, cause the IHS to: identify an event associated with presentation of an image produced by a display coupled to the processor, where the display is visible to a user's eyes, and the user is located in an environment; and control a transparency or translucency of a shutter layer disposed, at least in part, between the display and the environment.

20 Claims, 3 Drawing Sheets

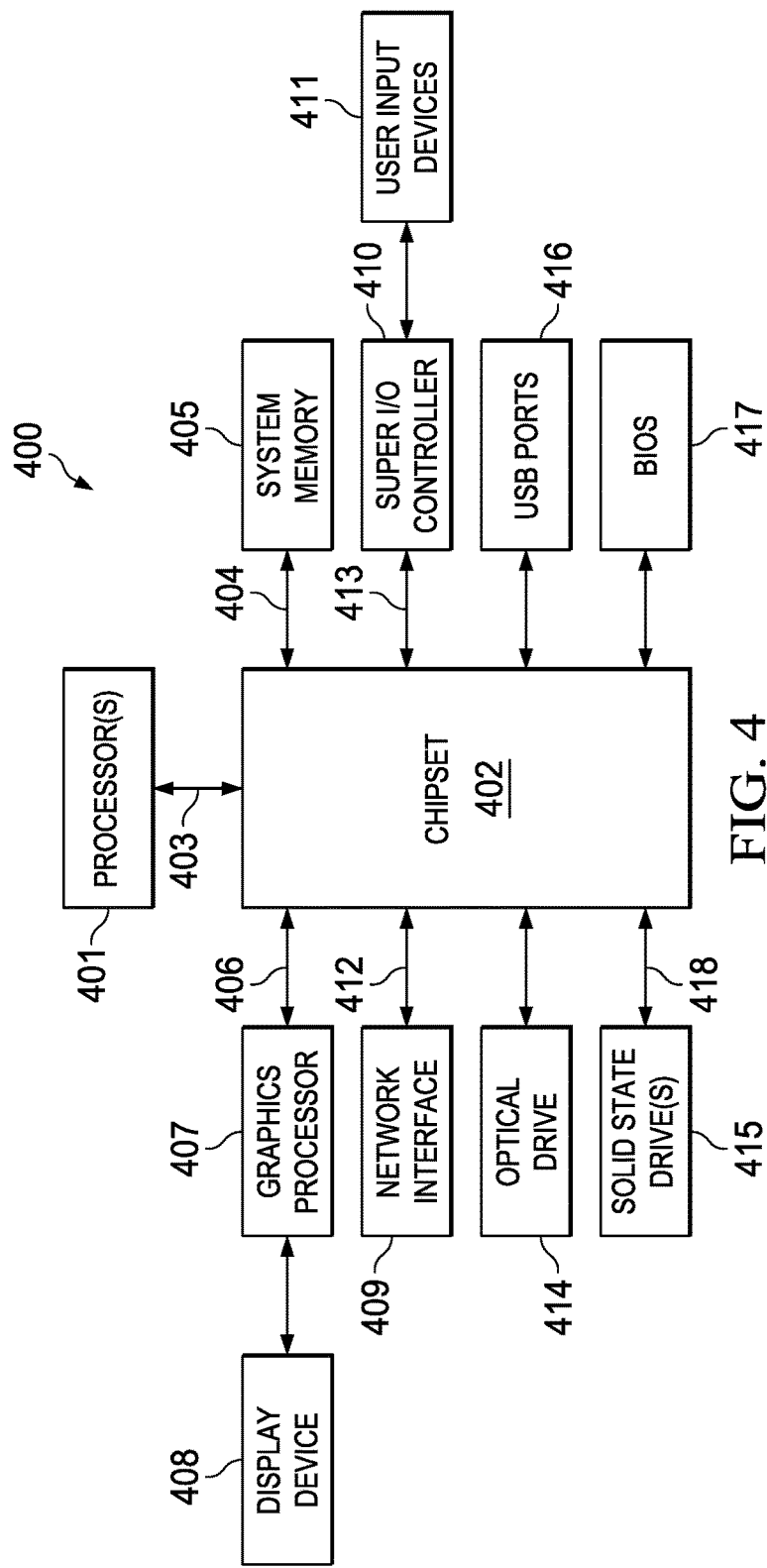

TRANSITIONING BETWEEN MIXED, AUGMENTED, AND/OR VIRTUAL REALITY DISPLAY MODES

FIELD

The present disclosure generally relates to information handling systems (IHSs), and, more particularly, to systems and methods for transitioning between mixed, augmented, and/or virtual reality display modes.

BACKGROUND

Virtual reality (VR) deals with purely digital, virtual environments. Generally speaking, the goal of VR is total user immersion. Typically, VR solutions attempt to obscure a user's physical surroundings such that only VR-generated graphics are visible to that user, usually via a head-mounted device (HMD) or the like.

Augmented reality (AR) may also use HMDs. But, in contrast with VR, AR overlays digital entities (e.g., characters, text, hyperlinks, images, graphics, etc.) onto the user's actual physical environment. Similar to VR, AR technology also enables digital entities to be provided to a user wearing a heads-up display (HUD). But, in the case of AR, those digital entities are displayed in combination with physical objects present in the user's field of view.

In mixed reality (MR), an HMD may also exhibit an awareness of the user's physical environment, but it may further allow digital entities to interact with that environment and vice-versa. For example, MR technology may enable a user to have a conversation (or any other form of interaction) with a holographic image of a person (or any other a digital entity) displayed on top of a four-legged table (or any other physical object) in front of the user.

As the inventors hereof have discovered, however, switching between these various operation modes with the same hardware is not yet possible because the same HMD device cannot provide both a fully immersive VR experience and a true MR experience. For example, it is not possible for a conventional HMD device to obscure the outside environment within a VR application, and thereafter provide visibility to that physical environment in response to the triggering of an AR/MR application. Moreover, in any of these operational modes, digital entities tend to wash out in certain environments (e.g., a bright sunny day).

SUMMARY

Embodiments of systems and methods for transitioning between mixed, augmented, and/or virtual reality display modes are described. In an illustrative, non-limiting embodiment, an information handling system (IHS) may comprise one or more processors and a memory coupled to the one or more processors, the memory including program instructions stored thereon that, upon execution by the one or more processors, cause the IHS to: identify an event associated with presentation of an image produced by a display coupled to the processor, wherein the display is visible to a user's eyes, and wherein the user is located in an environment; and control a transparency or translucency of a shutter layer disposed, at least in part, between the display and the environment.

In some cases, the IHS may include a head-mounted device (HMD). For example, display may include: an Organic Light-Emitting Diode (OLED) display comprising one or more flexible sheets of organic electroluminescent material, or a projected display.

The event may indicate a transition from a first mode of operation to a second mode of operation. The first and second modes of operation may be selected from the group consisting of: augmented reality, mixed reality, and virtual reality.

The first mode of operation may be the augmented reality mode, the second mode of operation may be the virtual reality mode, and controlling the transparency or translucency may include decreasing the transparency or translucency of the shutter layer to allow less light from the environment to reach the user's eyes. Additionally or alternatively, the first mode of operation may be the virtual reality mode, the second mode of operation may be the augmented reality mode, and controlling the transparency or translucency may include increasing the transparency or translucency of the shutter layer to allow more light from the environment to reach the user's eyes. Additionally or alternatively, controlling the transparency or translucency of the shutter layer may include concurrently increasing the transparency or translucency of a portion of the shutter layer and decreasing the transparency or translucency of another portion of the shutter layer.

In another illustrative, non-limiting embodiment, a method may implement one or more of the aforementioned operations. In yet another illustrative, non-limiting embodiment, a hardware memory device may have program instructions stored thereon that, upon execution by an IHS, cause the IHS to perform one or more of the aforementioned operations.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

FIG. 4 illustrates an example of an information handling system (IHS) according to some embodiments.

DETAILED DESCRIPTION

In various embodiments, systems and methods described herein may be configured to provide any mixed reality (MR), augmented reality (AR), and/or virtual reality (VR) application now in existence or yet to be developed. For example, a head-mounted device (HMD) may be configured or adapted to serve as a VR, AR, and/or MR system, at least in part, by controlling the visibility of a user's physical surroundings on-demand. Although particularly applicable to HMDs, certain devices and techniques described herein may be applied in many other device, such as, for example, a "smart windshield" of an otherwise conventional vehicle (e.g., car, bus, airplane, etc.).

Accordingly, systems and methods described herein may allow an HMD to manage the visibility of user's physical surroundings programmatically. And, to accomplish this, the level of external light passing through the HMD and reaching the user's eyes may be controlled.

Figure 1:
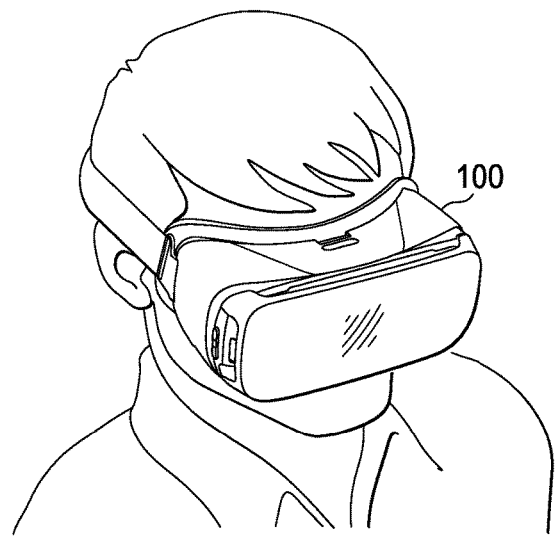
FIG. 1 illustrates an example of a head-mounted device (HMD) according to some embodiments.

FIG. 1 illustrates an example of head-mounted device (HMD) 100, according to some embodiments. As shown, a human user of HMD 100 can see its physical environment via a see-through a display system, glass, and/or lens. For example, HMD 100 may include one or more transparent or translucent Organic Light-Emitting Diode (OLED) displays comprising one or more flexible sheets of organic electroluminescent material. Additionally or alternatively, transparent OLEDs may be replaced with a projected display (e.g., MICROSOFT's "Hololens").

In some cases, first OLED display may be disposed in front of the user's right eye, and a second OLED display may be disposed in front of the user's left eye. Alternatively, a single OLED display may be used for both eyes.

The OLED display(s) may show information in the form of digital entities (e.g., characters, text, hyperlinks, images, graphics, etc.) overlaying a visible, physical environment in the user's field of view. In some cases, these digital entities may be relevant to a physical object located within the environment (i.e., in an AR/MR application). Additionally or alternatively, the OLED display(s) may completely immerse the user is a purely virtual, digital environment (e.g., in a VR application), such that, for practical purposes, the physical environment is no longer visible to the user.

Figure 2A:
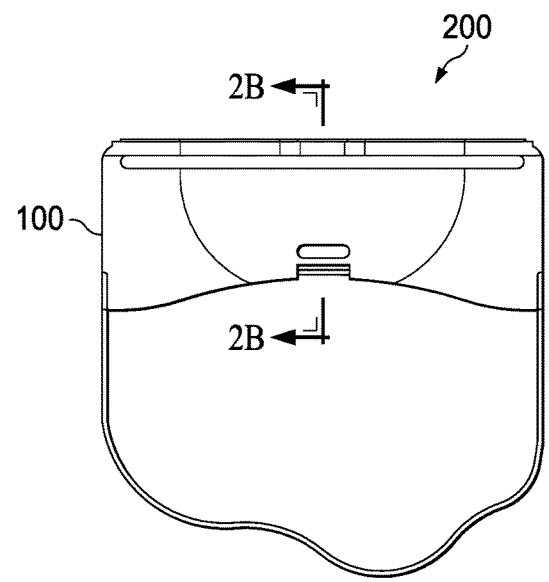
FIGS. 2A-B illustrate an example of a shutter layer and a display layer of an HMD according to some embodiments.
Figure 2B:
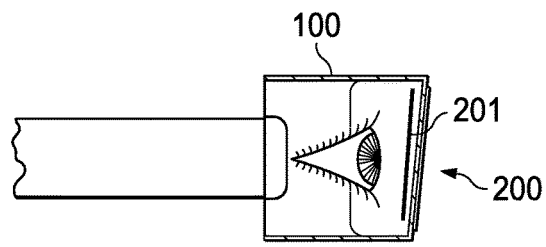

FIGS. 2A-B provide an example of "shutter layer" 200 and "display layer" 201 of HMD 100, according to some embodiments. Specifically, FIG. 2A shows a top view of HMD 100, and FIG. 2B illustrates a cross-section view of HMD 100. Collectively, FIGS. 2A-B show that the user's eyes see through at least two layers 200 and 201. The first layer is an image or display layer 201, which may include a pair of transparent OLED displays or the like, one for each eye.

Image layer 201 may appear opaque for brighter colors, and it may be completely opaque at white. Conversely, image layer 201 may also appear more transparent for dark colors, and it may be completely transparent at black.

It should be noted that the terms "completely," "totally," and "purely" (and other similar terms) generally refer to the visual perception produced by an image or display to an average, healthy human eye. As a person of ordinary skill in the art will immediately recognize in light of this disclosure, however, there may be still a small degree of transparency or translucency, even at full white; but the human eye does not perceive this because RGB elements of each pixel of the OLED display(s) are perceptibly much brighter (e.g., ten times or more) than the incoming light from external sources, such as the user's physical environment.

The image that the user sees in VR mode, or the image that the user sees juxtaposed onto all or part of the real external environment in MR or AR modes, may be produced by image layer 201.

The second, outer layer 200, also referred to as a "shutter layer 200," may have its translucency electronically controlled ranging from 0% (completely opaque) to 100% (completely transparent), either continuously or in discrete levels. Layer 200 may be built with any one of a number of different materials, such as electro-chromic glass or polymer-dispersed liquid crystal (PDLC), for example, or other "smart glass" material.

In various embodiments, systems and methods described herein may change the transparency or translucency perceived by a user of the HMD 100 by applying a control voltage or signal to contact(s), connector(s), interface(s), or input(s) of shutter layer 200. This control signal may change in magnitude or value in connection with the switching between an AR/MR mode of operation and a VR mode of operation (and vice-versa) in real-time, as desired, and/or as needed by any application.

Figure 3:
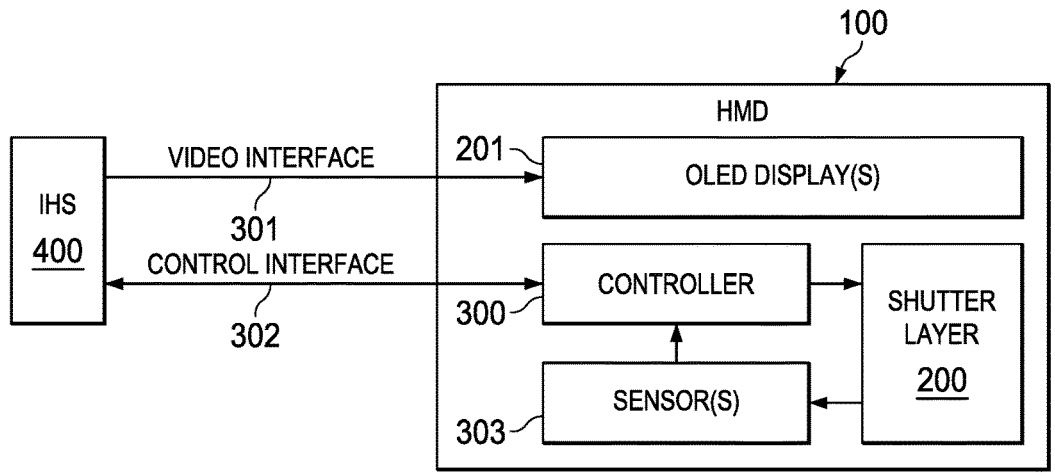
FIG. 3 illustrates an example of components of an HMD according to some embodiments.

FIG. 3 illustrates an example of components of HMD 100 according to some embodiments. IHS 400 is described in more detail below, is coupled to HMD 100 via a wired (e.g., USB) or wireless connection (e.g., Wi-Fi, Bluetooth, etc.), thus creating video interface 301 and control interface 302.

Video interface 301 drives both a right and left OLED displays 201 (one for each eye), in order to provide a three-dimensional (3D) or stereoscopic view. In some cases, video interface may include two separate video interfaces, one for each OLED display 201. Additionally or alternatively, a single DISPLAYPORT interface that supports multi-stream may be used to drive both displays 201. As noted above, each of the right and left-eye 201 display may be implemented as a transparent OLED.

HMD device 100 employs shutter controller 300 to control the amount of translucency of transparency or variable shutter layer 200 that covers the viewing area of HMD 100. Shutter layer 200 is made of, or other includes, materials that can made opaque to nearly entirely transparent via the application of a control voltage using control interface 302.

Controller 300 receives input from IHS 400 via interface 302, which allows an application or user setting to change HMD 100 from VR to AR to MR or back, by varying the translucency of shutter layer 200.

Shutter controller 300 may also receive input from an Ambient Light Sensor (ALS) 303 in HMD 101, and may use that input to vary the translucency of shutter layer 200 in AR or MR modes to compensate for the ambient light. For example, if the user is in a very bright environment, sensor(s) 303 may provide that data to controller 300 to reduce the translucency of shutter layer 200, so that the brightness of the external environment does not wash out the image being displayed on the transparent OLED(s) 201.

As a person of ordinary skill in the art will recognize in light of this disclosure, however, FIG. 3 shows only portions of the host system interface and HMD that are relevant for understanding the systems and methods described herein. Yet, it should be noted that, in various implementations, power and other wired or wireless signals may be passed between IHS 400, HMD 100, and/or other components. Moreover, in some cases, HMD 100 may itself be an IHS, such that elements 301, 302, and 400 are built into HMD 100.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

FIG. 4 is a block diagram of an IHS 400 configured according to certain embodiments. IHS 400 may include one or more processors 401. In various embodiments, IHS 400 may be a single-processor system including one processor 401, or a multi-processor system including two or more processors 401. Processor(s) 401 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

IHS 400 includes chipset 402 that may include one or more integrated circuits that are connect to processor(s) 401. In certain embodiments, chipset 402 may utilize a QPI (QuickPath Interconnect) bus 403 for communicating with the processor(s) 401. Chipset 402 provides the processor(s) 401 with access to a variety of resources. For instance, chipset 402 provides access to system memory 405 over memory bus 404. System memory 405 may be configured to store program instructions and/or data accessible by processors(s) 401. In various embodiments, system memory 405 may be implemented using any suitable memory technology, such as static RAM (SRAM), dynamic RAM (DRAM) or nonvolatile/Flash-type memory.

Chipset 402 may also provide access to a graphics processor 407. In certain embodiments, graphics processor 407 may be comprised within one or more video or graphics cards that have been installed as components of the IHS 400. Graphics processor 407 may be coupled to the chipset 402 via a graphics bus 406 such as provided by an AGP (Accelerated Graphics Port) bus or a PCIe (Peripheral Component Interconnect Express) bus. In certain embodiments, a graphics processor 407 generates display signals and provides them to HMD device 100 (or any other display device 408).

In certain embodiments, chipset 402 may also provide access to one or more user input devices 411. In such embodiments, chipset 402 may be coupled to a super I/O controller 140 that provides interfaces for a variety of user input devices 411, in particular lower bandwidth and low data rate devices. For instance, super I/O controller 410 may provide access to a keyboard and mouse or other peripheral input devices. In certain embodiments, super I/O controller 410 may be used to interface with coupled user input devices 411 such as keypads, biometric scanning devices, and voice or optical recognition devices. The I/O devices, such as may interface super I/O controller 410 through wired or wireless connections. In certain embodiments, chipset 402 may be coupled to the super I/O controller 410 via a Low Pin Count (LPC) bus 413.

Other resources may also be coupled to the processor(s) 401 of the IHS 400 through the chipset 402. In certain embodiments, chipset 402 may be coupled to a network interface 409, such as provided by a Network Interface Controller (NIC) that is coupled to the IHS 400. In certain embodiments, the network interface 409 may be coupled to the chipset 402 via a PCIe bus 412. According to various embodiments, network interface 409 may support communication via various wired and/or wireless networks. In certain embodiments, the chipset 402 may also provide access to one or more Universal Serial Bus (USB) ports 416.

Chipset 402 also provides access to one or more solid state storage devices 415. The chipset 402 utilizes a PCIe bus interface connection 418 in order to communication with the solid state storage device 415. In certain embodiments, chipset 402 may also provide access to other types of storage devices. For instance, in addition to the solid state storage device 415, an IHS 400 may also utilize one or more magnetic disk storage devices, or other types of the storage devices such as an optical drive or a removable-media drive. In various embodiments, the solid state storage device 415 may be integral to the IHS 400, or may be located remotely from the IHS 400.

Another resource that may be accessed by processor(s) 401 via chipset 402 is a BIOS (Basic Input/Output System) 417. As described in more detail below with respect to additional embodiments, upon powering or restarting IHS 400, processor(s) 401 may utilize BIOS 417 instructions to initialize and test hardware components coupled to the IHS 400 and to load an operating system for use by the IHS 400. The BIOS 417 provides an abstraction layer that allows the operating system to interface with certain hardware components that are utilized by IHS 400. Via this hardware abstraction layer provided by BIOS 417, the software executed by the processor(s) 401 of IHS 400 is able to interface with certain I/O devices that are coupled to the IHS 400. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In various embodiments, IHS 400 may not include each of the components shown in FIG. 4. Additionally or alternatively, IHS 400 may include various components in addition to those that are shown in FIG. 4. Furthermore, some components that are represented as separate components in FIG. 4 may, in some embodiments, be integrated with other components. For example, in various implementations, all or a portion of the functionality provided by the illustrated components may instead be provided by components integrated into the one or more processor(s) 401 as a system-on-a-chip (SOC) or the like.

As such, FIG. 4 shows various internal components of an example IHS 400 configured to implement systems and methods described herein. It should be appreciated, however, that although IHS 400 is usually embodied as a laptop or other conventional computing device, other implementations may be utilized with various other types of information handling devices (e.g., smart phones, smart watches, tablets, etc.).

Figure 5:
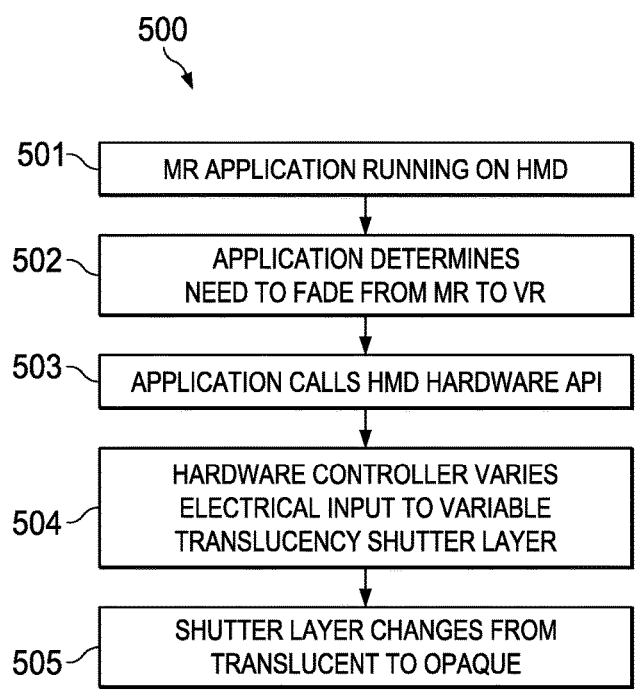
FIG. 5 illustrates an example of a method for transitioning between mixed, augmented, and/or virtual reality display modes according to some embodiments.

FIG. 5 illustrates an example of method 500 for transitioning between mixed, augmented, and/or virtual reality display modes according to some embodiments. In this example, a software application is operating in MR mode (translucent shutter), and then determines to transition to VR mode (opaque shutter). It will be readily understood in light of this disclosure, however, that the transition between VR mode to MR or AR mode may be achieved in the same way, but in the reverse direction.

At block 501, the MR application is executed by IHS 400 and/or HMD 100. At block 502, the MR application determines a need to fade from MR to VR. At block 503, the MR application makes a call or sends a command, via an HMD hardware application programming interface (API), for HMD 100 to switch from MR mode to VR mode. At block 504, controller 300 varies an electrical input signal provided to shutter layer 200. In response, at block 505, shutter layer 200 changes from translucent to opaque in order to accommodate the total immersion effect typically desirable when operating in VR mode.

To better illustrate the foregoing, consider a non-limiting use case that switches between MR and VR on-the-fly. For instance, a video game may begin in MR mode, inside a user's living room, by placing digital entities (such as characters, text, graphics, etc.) inside, in front of, behind and/or alongside the user's actual physical environment. The game creates a digital entity in the form of a portal, through which the user passes and the living room fades out, thereby entirely obscuring the user's surroundings. After "entering" the portal, the user may be completely immersed in VR for some time, after which the user may walk back through the portal (still in VR mode) to "return" to his or her living room.

Consider yet another use case where an HMD is used for a work activity such as, for example, building renovation. The HMD may present the user with any from of display ranging from an entirely real physical reality (that is, a transparent display) all the way to a complete, immersive walkthrough of completed renovation (e.g., a VR experience), or any intermediate in-between (MR/AR). In either situation, the user may walk around the building and observe physical objects and/or virtual entities from any position or angle.

In some cases, controlling the transparency or translucency of shutter layer 200 may include modifying the transparency or translucency of a first portion of shutter layer 200 to a first degree (e.g., by increasing the transparency of shutter layer 200 in the first portion) and modifying the transparency or translucency of a second portion of shutter layer 200 to a different, second degree (e.g., by decreasing the transparency of shutter layer 200 in the second portion).

For example, the first portion of shutter layer 200 may correspond one of the user's eyes (e.g., the left eye or left OLED display), and the second portion of shutter layer 200 may correspond to the other eye (e.g., the right eye or right OLED display). Additionally or alternatively, the first portion of shutter layer 200 may correspond to a bottom portion of image layer 201 (in both OLED displays), and the second portion of shutter layer 200 may correspond to a top portion of image layer (still referring to both OLED displays). Yet additionally or alternatively, the first portion of shutter layer 200 may include a first pattern (e.g., the "white squares" of a "checkerboard" pattern or the like), and the second portion of shutter layer 200 may include a second pattern (e.g., the "black squares" of that same "checkerboard" pattern). Still additionally or alternatively, the first or second portion of shutter layer 200 may include the "internal" perimeter of physical object(s) within the user's field of view (by following the contour of those object(s)), and a remaining portion of shutter layer 200 may include the portion of the user's field of view surrounding those physical object(s), such that either the object(s) or the environment may be replaced with virtual elements, in a manner independent of each other, as instructed by the software application.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
one or more processors; and
a memory coupled to the one or more processors, the memory including program instructions stored thereon that, upon execution by the one or more processors, cause the IHS to:
detect an event associated with presentation of an image produced by a display coupled to the processor, wherein the display is visible to a user's eyes, and wherein the user is located in an environment; and
in response to the event, control a transparency or translucency of a shutter layer disposed, at least in part, between the display and the environment, wherein the shutter layer comprises a liquid crystal layer, and wherein controlling the transparency or translucency comprises concurrently increasing the transparency or translucency of a first portion of the liquid crystal layer and decreasing the transparency or translucency of a second portion of the liquid crystal layer.

2. The IHS of claim 1, further comprising a head-mounted device (HMD), wherein the display comprises: an Organic Light-Emitting Diode (OLED) display comprising one or more flexible sheets of organic electroluminescent material, or a projected display.

3. The IHS of claim 1, wherein the event indicates a transition from a first mode of operation to a second mode of operation.

4. The IHS of claim 3, wherein the first mode of operation is an augmented reality mode, wherein the second mode of operation is a virtual reality mode, and wherein controlling the transparency or translucency includes decreasing the transparency or translucency of the shutter layer to allow less light from the environment to reach the user's eyes.

5. The IHS of claim 3, wherein the first mode of operation is a virtual reality mode, wherein the second mode of operation is an augmented reality mode, and wherein controlling the transparency or translucency includes increasing the transparency or translucency of the shutter layer to allow more light from the environment to reach the user's eyes.

6. A hardware memory device having program instructions stored thereon that, upon execution by an Information Handling System (IHS), cause the IHS to:
   detect an event associated with presentation of an image produced by a display coupled to the processor, wherein the display is visible to a user's eyes, and wherein the user is located in an environment; and
   in response to the event, control a transparency or translucency of a shutter layer disposed between the display and the environment, wherein the event comprises a user's physical interaction with a virtual object rendered on the display.

7. The hardware memory of claim 6, further comprising a Head-Mounted Device (HMD).

8. The hardware memory of claim 6, wherein the display comprises an Organic Light-Emitting Diode (OLED) display.

9. The hardware memory of claim 6, wherein the event indicates a transition from a first mode of operation to a second mode of operation, and wherein the first and second modes of operation are selected from the group consisting of: augmented reality, mixed reality, and virtual reality.

10. The hardware memory of claim 9, wherein the first mode of operation is the augmented reality mode, wherein the second mode of operation is the virtual reality mode, and wherein controlling the transparency or translucency includes decreasing the transparency or translucency of the shutter layer to allow less light from the environment to reach the user's eyes.

11. The hardware memory of claim 9, wherein the first mode of operation is the virtual reality mode, wherein the second mode of operation is the augmented reality mode, and wherein controlling the transparency or translucency includes increasing the transparency or translucency of the shutter layer to allow more light from the environment to reach the user's eyes.

12. A computer-implemented method, the method comprising:
   detecting an event associated with presentation of an image produced by a display coupled to a processor of an Information Handling System (IHS), wherein the display is visible to a user's eyes, and wherein the user is located in an environment; and
   in response to the event, controlling a transparency or translucency of a shutter layer disposed between the display and the environment, wherein the event comprises a user's walking through a virtual portal rendered on the display.

13. The computer-implemented method of claim 12, further comprising a Head-Mounted Device (HMD).

14. The computer-implemented method of claim 12, wherein the display comprises an Organic Light-Emitting Diode (OLED) display.

15. The computer-implemented method of claim 12, wherein the event indicates a transition from a first mode of operation to a second mode of operation, and wherein the first and second modes of operation are selected from the group consisting of: augmented reality, mixed reality, and virtual reality.

16. The computer-implemented method of claim 15, wherein the first mode of operation is the augmented reality mode, wherein the second mode of operation is the virtual reality mode, and wherein controlling the transparency or translucency includes decreasing the transparency or translucency of the shutter layer to allow less light from the environment to reach the user's eyes.

17. The computer-implemented method of claim 15, wherein the first mode of operation is the virtual reality mode, wherein the second mode of operation is the augmented reality mode, and wherein controlling the transparency or translucency includes increasing the transparency or translucency of the shutter layer to allow more light from the environment to reach the user's eyes.

18. The IHS of claim 1, wherein the first portion of the crystal liquid layer is over a first eye of the user and the second portion of the crystal liquid layer is over a second eye of the user.

19. The IHS of claim 1, wherein the first portion of the crystal liquid layer is over a first portion of the display and the second portion of the crystal liquid layer is a second portion of the display.

20. The IHS of claim 19, wherein the first portion of the crystal liquid layer comprises a first geometric pattern and wherein the second portion of the crystal liquid layer comprises a second geometric pattern.

* * * * *